United States Patent
Nomoto et al.

(10) Patent No.: US 11,367,544 B2
(45) Date of Patent: Jun. 21, 2022

(54) GROMMET AND WIRE HARNESS

(71) Applicants: Yazaki Corporation, Tokyo (JP); TOYOTA JIDOSHA KABUSHIKI KAISHA, Aichi-ken (JP)

(72) Inventors: Takashi Nomoto, Aichi (JP); Yoshiyuki Ishihara, Aichi (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/111,484

(22) Filed: Dec. 3, 2020

(65) Prior Publication Data

US 2021/0174992 A1 Jun. 10, 2021

(30) Foreign Application Priority Data

Dec. 5, 2019 (JP) .............................. JP2019-220253

(51) Int. Cl.
*H01B 17/26* (2006.01)
*H01B 17/58* (2006.01)
*H01B 17/30* (2006.01)

(52) U.S. Cl.
CPC ......... *H01B 17/265* (2013.01); *H01B 17/301* (2013.01); *H01B 17/583* (2013.01)

(58) Field of Classification Search
CPC ............ B60R 16/0207; B60R 16/2015; B60R 16/0222; H02G 3/22; H01B 17/583; H01B 7/0045
See application file for complete search history.

(56) References Cited

U.S. PATENT DOCUMENTS

| 2,030,115 | A | * | 2/1936 | Muldoon | ........... H01R 13/6335 |
| | | | | | 439/484 |
| 9,548,563 | B1 | * | 1/2017 | Vazquez | ............ H01R 13/6335 |
| 2008/0194131 | A1 | * | 8/2008 | Ikeya | .................. H01R 13/6215 |
| | | | | | 439/271 |

FOREIGN PATENT DOCUMENTS

| JP | H02-136423 U | 11/1990 |
| JP | H08-106830 A | 4/1996 |

* cited by examiner

*Primary Examiner* — Paresh Paghadal

(74) *Attorney, Agent, or Firm* — Kenealy Vaidya LLP

(57) ABSTRACT

A grommet includes a ring-shaped water stop portion inserted into a through hole formed in an attachment panel and performing water stopping, a closing portion projecting toward radial inside of the water stop portion and closing a ring shape of the water stop portion, a tube portion extending in a direction crossing an axis direction of the water stop portion and provided to penetrate the closing portion and through which a wire material is inserted, and a handle portion provided in an arch shape with respect to the closing portion with a central axis of the water stop portion serving as a center.

4 Claims, 7 Drawing Sheets

GROMMET AND WIRE HARNESS

CROSS-REFERENCE TO RELATED APPLICATION(S)

The present application claims priority to and incorporates by reference the entire contents of Japanese Patent Application No. 2019-220253 filed in Japan on Dec. 5, 2019.

BACKGROUND OF THE INVENTION

1. Field of the Invention

The present invention relates to a grommet and a wire harness.

2. Description of the Related Art

As a conventional grommet mounted on a vehicle, for example, Japanese Utility Model Application Laid-open No. H2-136423 discloses a grommet to perform wiring inside a narrow space. The grommet includes an attachment portion to a panel or the like, a bent portion formed to connect with the attachment portion and regulating a direction of a wire harness in a substantially L shape, a lead wire portion formed to connect with the bent portion, and a wire harness extraction portion formed at a free end portion of the lead wire portion.

The grommet as disclosed in Japanese Utility Model Application Laid-open No. H2-136423 mentioned above has low workability, because the peripheral part of the attachment portion is pushed into a through hole of the panel when the attachment portion is attached to the through hole of the panel.

SUMMARY OF THE INVENTION

The present invention has been made in view of the circumstances described above, and an object of the present invention is to provide a grommet and a wire harness capable of improving workability in attachment.

In order to achieve the above mentioned object, a grommet according to one aspect of the present invention includes a ring-shaped water stop portion inserted into a through hole formed in an attachment panel and performing water stopping; a closing portion projecting toward a radial inside of the water stop portion and closing a ring shape of the water stop portion; a tube portion extending in a direction crossing an axis direction of the water stop portion and provided to penetrate the closing portion and through which a wire material is inserted; and a handle portion provided in an arch shape with respect to the closing portion with a central axis of the water stop portion serving as a center.

According to another aspect of the present invention, in the grommet, it is possible to configure that the handle portion is provided to be elastically deformable at least in the axis direction of the water stop portion.

According to still another aspect of the present invention, in the grommet, it is possible to configure that the handle portion includes end portions of the arch shape, the end portions being fixed on the closing portion and arranged at a uniform distance from an outer circumferential edge of the water stop portion.

In order to achieve the above mentioned object, a wire harness according to still another aspect of the present invention includes a wire material having conductivity; and a grommet provided on the wire material, wherein the grommet includes a ring-shaped water stop portion inserted into a through hole formed in an attachment panel and performing water stopping, a closing portion projecting toward a radial inside of the water stop portion and closing a ring shape of the water stop portion, a tube portion extending in a direction crossing an axis direction of the water stop portion and provided to penetrate the closing portion and through which the wire material is inserted, and a handle portion provided in an arch shape with respect to the closing portion with a central axis of the water stop portion serving as a center.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention will be explained in detail hereinafter on the basis of the drawings. The present invention is not limited to the embodiment. Constituent elements in the following embodiment include elements that the skilled person can replace or easily replace, or that are substantially the same elements.

Embodiment

A grommet 1 according to the present embodiment illustrated in FIG. 1 to FIG. 4 is integrated into a wire harness WH wired in a vehicle or the like. The wire harness WH forms an assembled component obtained by bundling a plurality of wire materials W used for power supply and/or signal communications to connect devices mounted on the vehicle, and connecting the wire materials W to the devices with connectors or the like. The wire harness WH includes the wire materials W having conductivity and the grommet 1 provided on the wire materials W and through which the wire materials W are inserted. The wire harness WH may further include various components, such as a corrugate tube, a resin tape, an exterior member such as a protector, an electrical connection box, a fixing tool, and the like. Each of the wire materials W is formed of, for example, a metal bar, an electrical wire, an electrical wire bundle, or the like. The metal bar has a structure obtained by covering the outside of a bar-shaped member having conductivity with an insulating coating portion. The electrical wire has a structure obtained by covering the outside of a conductor portion (core wire) formed of a plurality of conductive metal wires with an insulating coating portion. The electrical wire bundle is obtained by bundling such electrical wires. The wire harness WH bundles and integrates the wire materials W, and the devices are electrically connected via connectors or the like provided on terminals of the bundled wire materials W.

Figure 5:
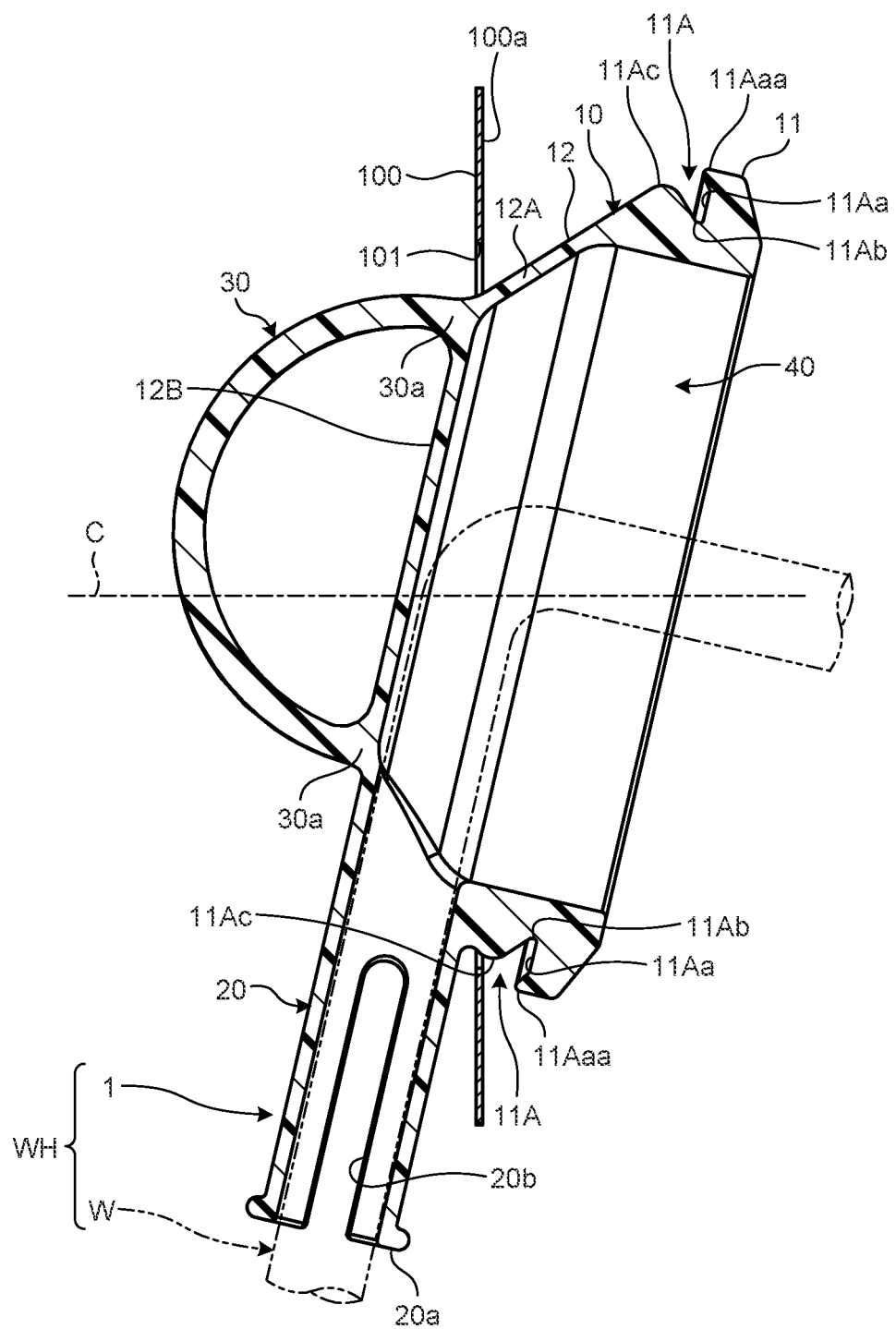
FIG. 5 is a sectional view illustrating attachment of the wire harness to which the grommet according to the embodiment is applied to an attachment panel.
Figure 6:
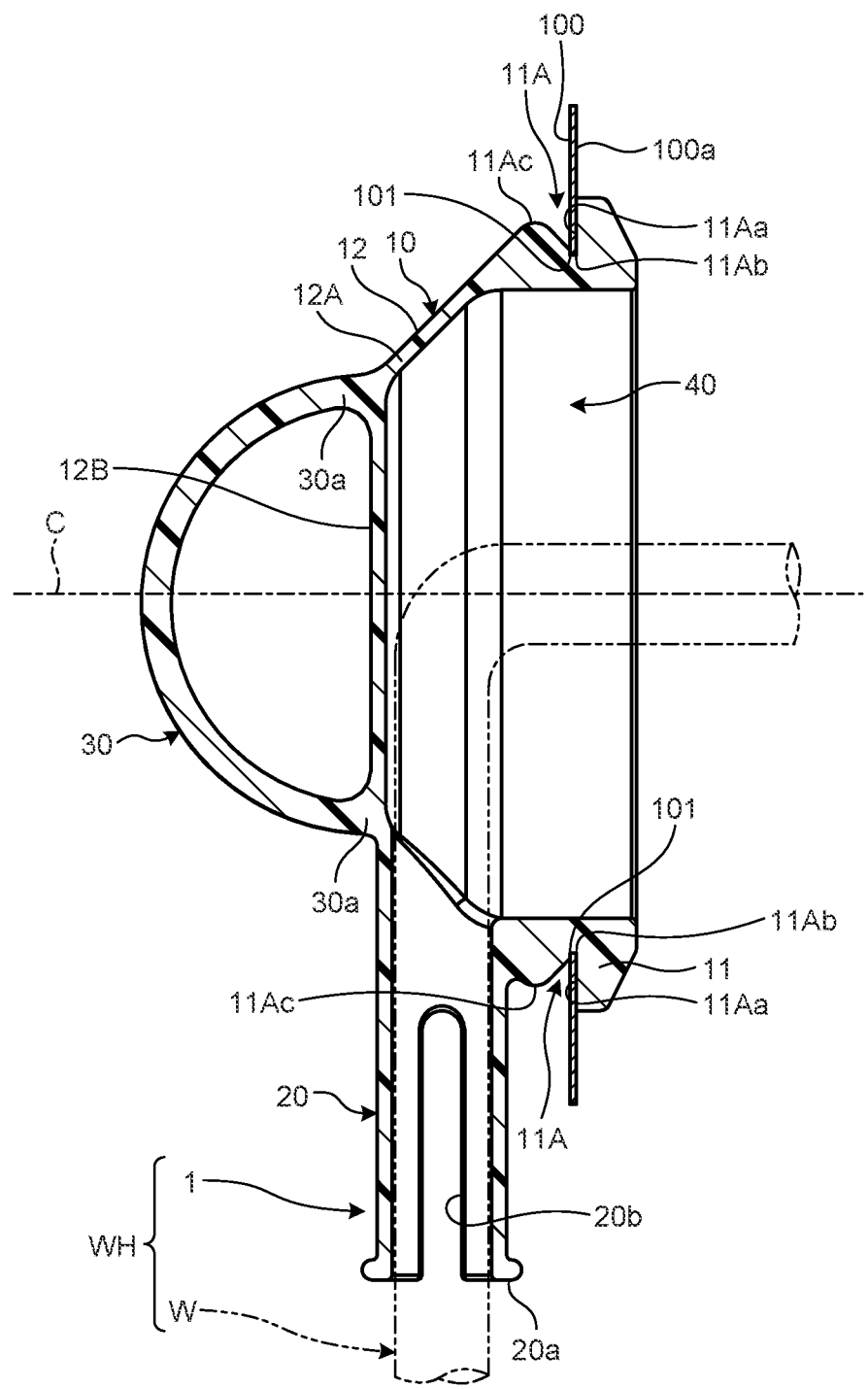
FIG. 6 is a sectional view illustrating an attached state of the wire harness to which the grommet according to the embodiment is applied to the attachment panel.
Figure 7:
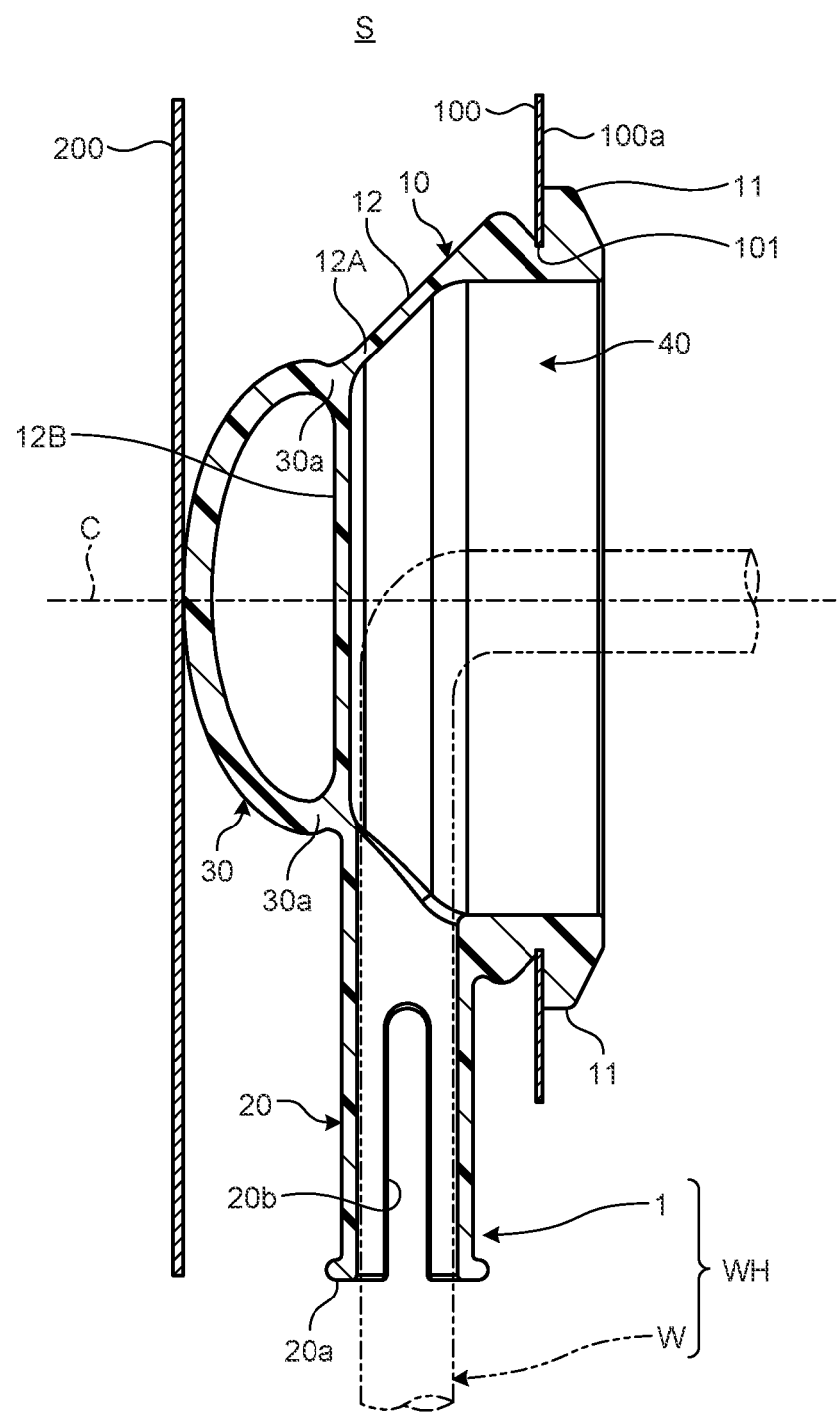
FIG. 7 is a sectional view illustrating a use state of the wire harness to which the grommet according to the embodiment is applied.

In addition, as illustrated in FIG. 5 to FIG. 7, the grommet 1 is applied to a through hole 101, when the wire materials W are wired over two spaces divided with an attachment panel 100 serving as a boundary via the through hole 101 formed in the attachment panel 100 being an attachment target. The attachment panel 100 is, for example, a metal plate forming a body or the like of the vehicle, and the through hole 101 penetrates the attachment panel 100 along the thickness direction. The two spaces divided with the attachment panel 100 serving as the boundary are typically a vehicle-inside space (for example, a cabin) and a vehicle-outside space (for example, an engine compartment). The grommet 1 is mounted on the through hole 101 in a state in which the wire materials W of the wire harness WH are inserted through the grommet 1 and the grommet 1 is provided around the wire materials W. In this manner, the grommet 1 protects the wire materials W extending through the through hole 101, and performs water stopping (waterproofing) on the through hole 101. The grommet 1 also has dustproof and sound insulation functions in addition to the waterproofing function for the through hole 101.

The following describes detailed explanation of the structure of the grommet 1 with reference to the drawings. As illustrated in FIG. 6, an axis direction is the thickness direction of the attachment panel 100 to which the grommet 1 is attached and the direction in which the through hole 101 penetrates the attachment panel 100. A central axis C extending through the center of the through hole 101 is orthogonal to the panel surface of the attachment panel 100, and extends along the axis direction. Thus, the axis direction is a direction in which the central axis C extends. The direction orthogonal to the central axis C is referred to as radial direction, the side away from the central axis C is referred to as radial outside, and the side close to the central axis C is referred to as radial inside. In addition, in a state in which the grommet 1 is attached to the through hole 101 of the attachment panel 100, the central axis in the grommet 1 is superposed on the central axis C of the through hole 101. For this reason, the central axis C that is the same as the central axis C of the through hole 101 is used for explanation for the grommet 1.

The grommet 1 according to the present embodiment has a structure in which the wire materials W are inserted through the inside of the grommet 1, as illustrated in FIG. 1 to FIG. 4. The grommet 1 is a seal member capable of stopping water between the grommet 1 and the through hole 101 of the attachment panel 100, as illustrated in FIG. 6. The grommet 1 includes a main member 10, a tube portion 20, and a handle portion 30, and formed as an elastic member with the components integrated into one unitary piece. The grommet 1 is formed of an insulating elastic resin material (such as ethylene-propylene-diene rubber (EPDM)) having low rigidity and high flexibility, such as rubber and thermoplastic elastomer.

Figure 4:
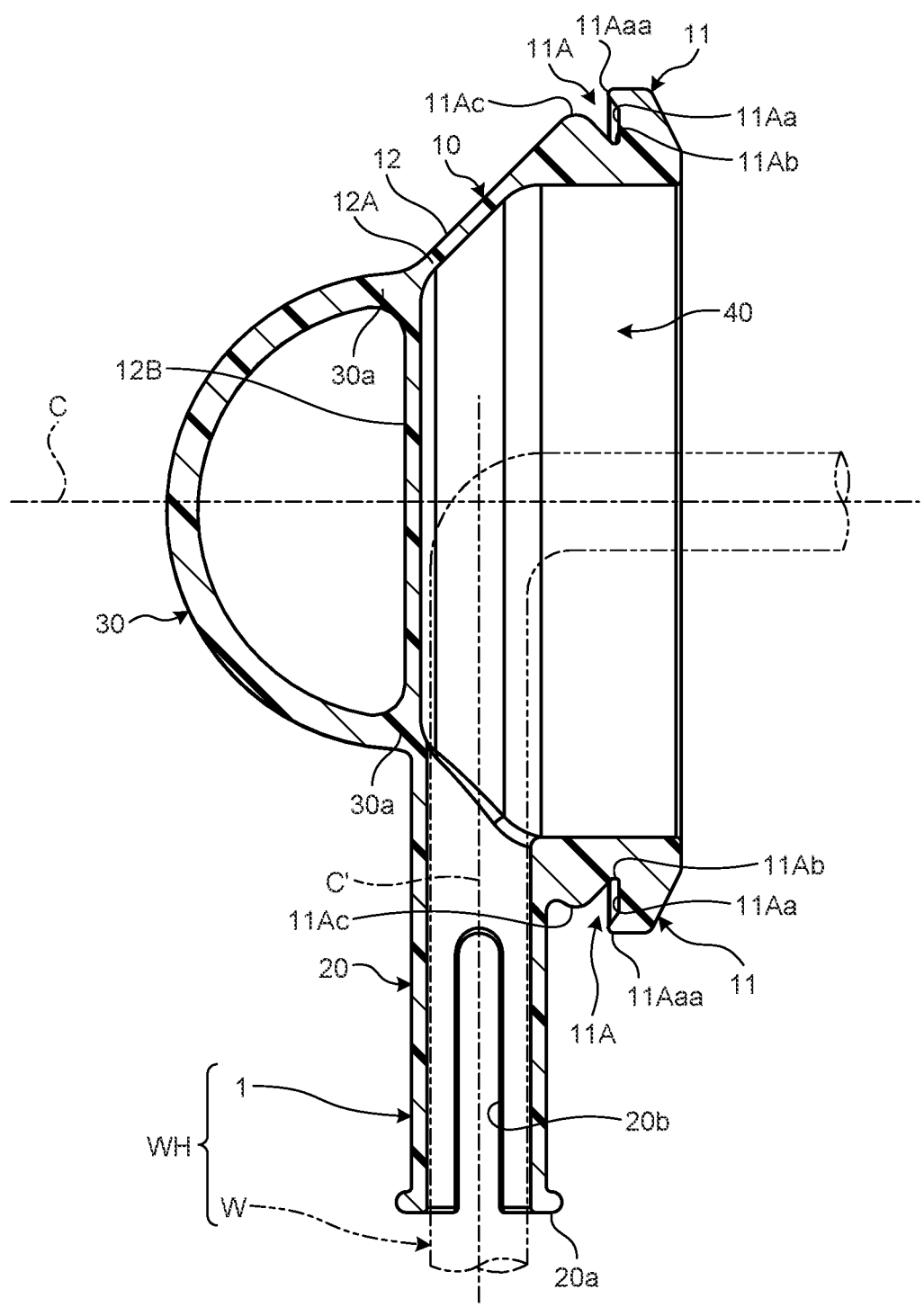
FIG. 4 is an A-A sectional view of FIG. 3.

The main member 10 includes a water stop portion 11 and a closing portion 12. The water stop portion 11 is a seal member inserted into the through hole 101 of the attachment panel 100 and stopping water between the through hole 101 and the water stop portion 11. The water stop portion 11 is formed in a ring shape with the central axis C serving as the center to match the ring shape of the through hole 101. In the present embodiment, the through hole 101 is formed in a circular shape, and the water stop portion is also formed in a circular shape. In the case where the through hole 101 is formed in an elliptic shape, the water stop portion 11 is also formed in an elliptic shape. An outer circumferential surface of the water stop portion 11 is provided with a groove-shaped recessed portion 11A continuous in a ring shape. The recessed portion 11A is provided to open to the radial outside, and includes an abutting surface 11Aa abutting against one panel surface 100a of the attachment panel 100, in the state in which the grommet 1 is attached to the attachment panel 100, as illustrated in FIG. 6. In addition, in the state in which the grommet 1 is attached to the attachment panel 100, a groove bottom 11Ab of the recessed portion 11A abuts against and fitted with an opening edge of the through hole 101. The recessed portion 11A also includes a large-diameter portion 11Ac provided to be opposed to the abutting surface 11Aa in the axis direction with the groove bottom 11Ab interposed therebetween. The large-diameter portion 11Ac is formed such that the radial size thereof increases slantly from the groove bottom 11Ab toward the radial outside and in the axis direction, and the radial size thereof is larger than the opening of the through hole 101, the large-diameter portion 11Ac projecting toward the radial outside. In addition, as illustrated in FIG. 4, a projection 11Aaa is formed at the radial outer edge of the abutting surface 11Aa. The projection 11Aaa is formed in a ring shape with the central axis C serving as the center. The projection 11Aaa functions as a water stop lip portion by abutting against the panel surface 100a of the attachment panel 100 and being collapsed by elastic deformation. The groove bottom 11Ab and the large-diameter portion 11Ac function as a holding portion preventing the abutting surface 11Aa from moving in a direction away from the panel surface 100a of the attachment panel 100. The water stop portion 11 configured as described above is formed with the largest radial size in the main member 10.

The closing portion 12 forms a partition wall projecting toward the radial inside of the water stop portion 11 and closing the ring shape of the water stop portion 11. The closing portion 12 is formed in a dome shape with a conic portion 12A and a flat portion 12B. The conic portion 12A projects such that the outer diameter thereof gradually decreases from the large-diameter portion 11Ac of the recessed portion 11A in the water stop portion 11 toward the side away from the water stop portion 11 toward the radial inside and in the axis direction. The flat portion 12B is provided in a flat shape and orthogonal to the axis direction in a narrowed portion of the conic portion 12A. In this manner, the closing portion 12 closes a part in the axis direction off a part of the recessed portion 11A including the large-diameter portion 11Ac in the water stop portion 11.

The tube portion 20 is a portion formed in one unitary piece with the main member 10 and in a tubular shape and through which the wire materials W are inserted. The tube portion 20 is connected to penetrate the conic portion 12A of the closing portion 12 in the main member 10. The tube portion 20 has a central axis C' of the tube shape, the central axis C' extending to cross the central axis C of the main member 10 such that the tube portion 20 extends from the conic portion 12A to cross the axis direction. In the present embodiment, the tube portion 20 has the central axis C' of the tube shape, the central axis C' extending orthogonal to the central axis C of the main member 10. In addition, the tube portion 20 extends from the conic portion 12A and has a distal end 20a positioned on the radial outside beyond the water stop portion 11 serving as the outer diameter of the main member 10 and having the largest radial size. Notches 20b may be formed in the tube portion 20. The notches 20b extend from the distal end 20a toward the main member 10 side along the central axis C', and are formed to a middle portion of the tube portion 20. A plurality of notches 20b are arranged at intervals in a circumferential direction with the central axis C' serving as the center. In the present embodiment, two notches 20b are provided. The tube portion 20 is divided into a plurality of pieces (two in the present embodiment) in the circumferential direction with the notches 20b. The wire materials W inserted into the ring shape of the water stop portion 11 is inserted into the tube portion 20 configured as described above. Because the central axes C and C' of the water stop portion 11 and the tube portion 20 cross each other, the wire materials W inserted into the water stop portion 11 and the tube portion 20 are bent inside the main member 10 extending from the water stop portion 11 to the tube portion 20. As described above, the grommet 1 according to the present embodiment is configured to be capable of changing the direction in which the inserted wire materials W extend.

Figure 1:
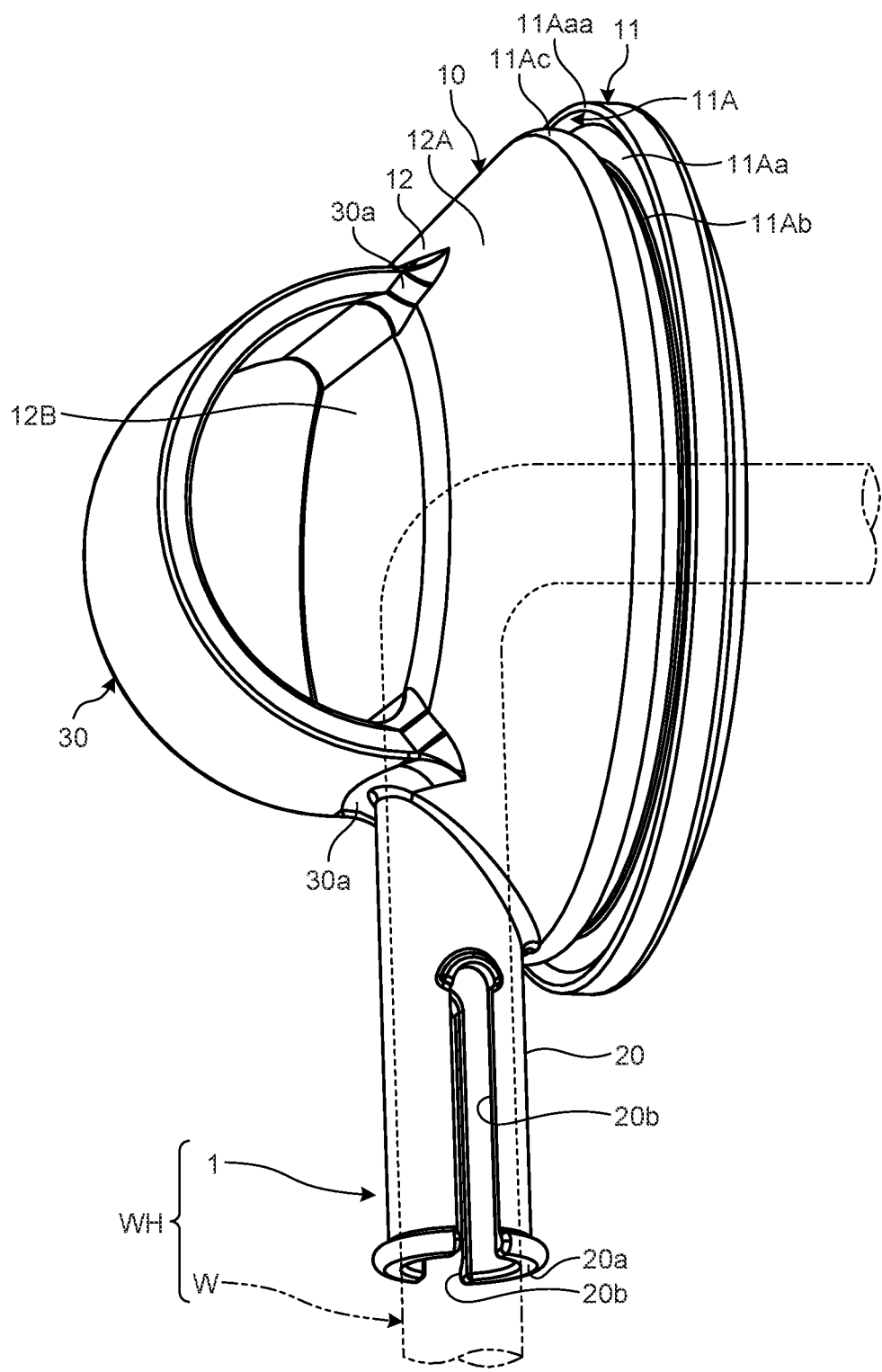
FIG. 1 is a perspective view illustrating a schematic structure of a wire harness to which a grommet according to an embodiment is applied.
Figure 2:
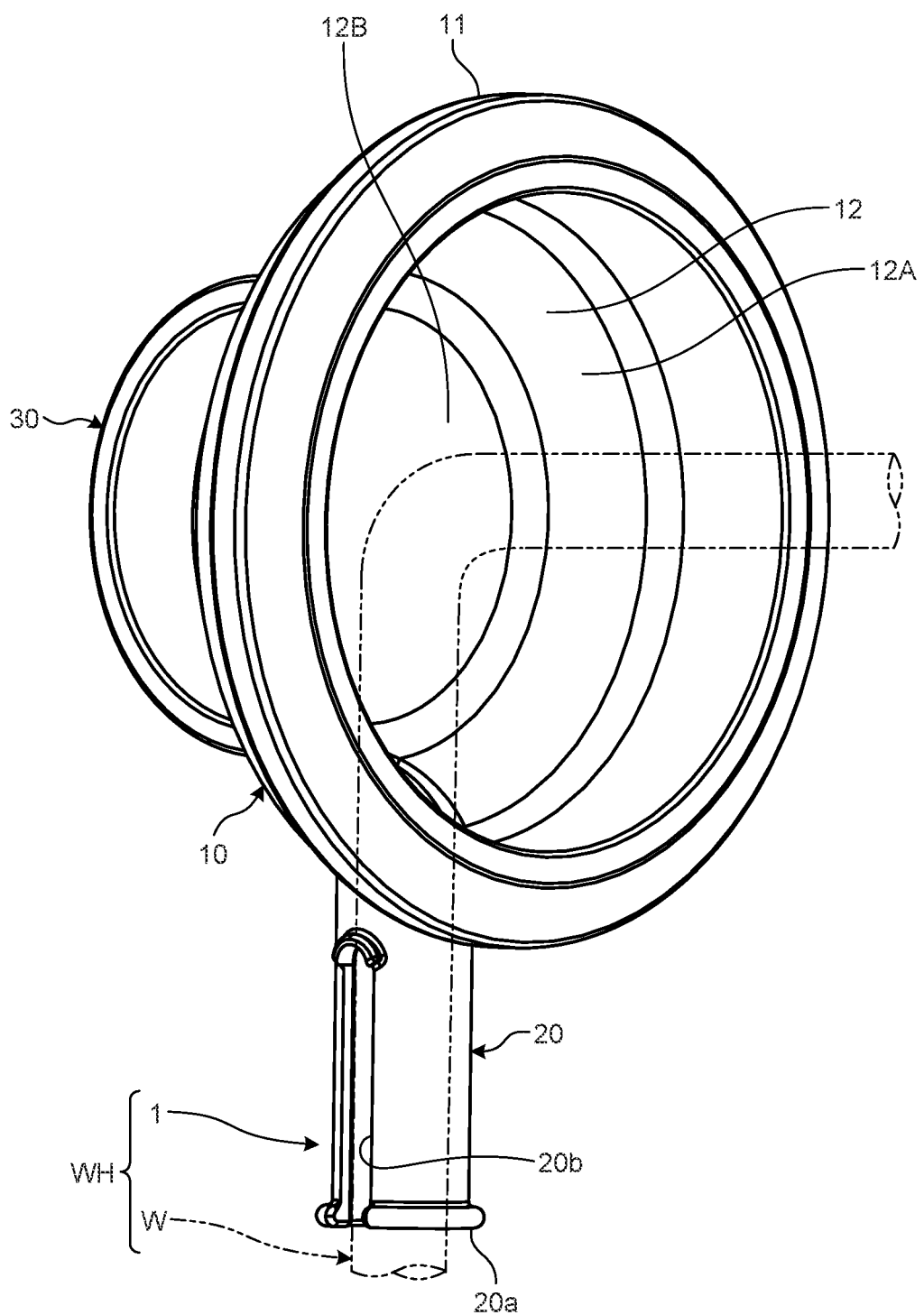
FIG. 2 is a perspective view illustrating a schematic structure of the wire harness to which the grommet according to the embodiment is applied.
Figure 3:
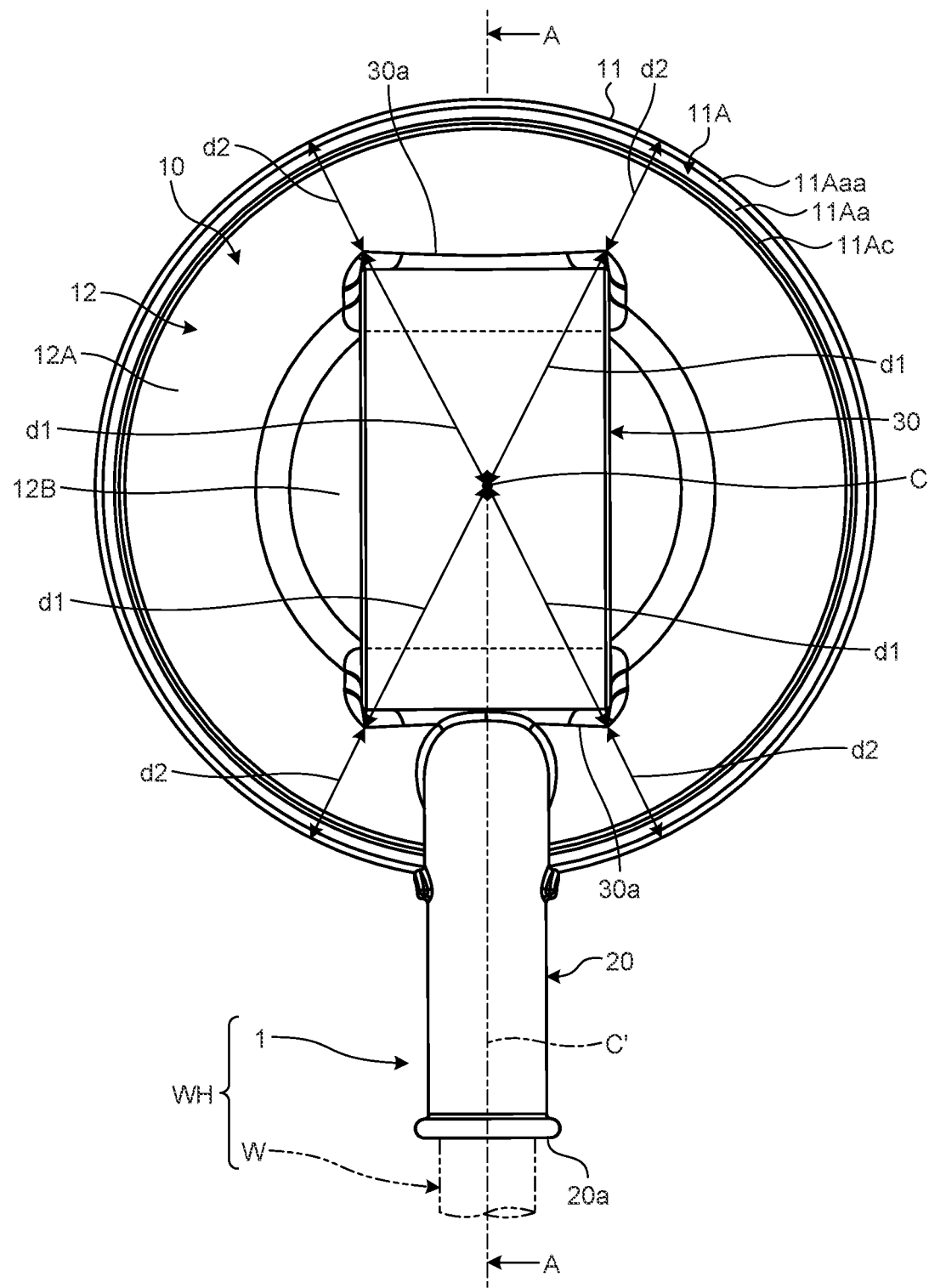
FIG. 3 is a plan view illustrating a schematic structure of the wire harness to which the grommet according to the embodiment is applied.

The handle portion 30 includes a belt-shaped central portion formed in an arch shape bent to project with respect to end portions 30a extending in a belt shape, and the end portions 30a are provided on the closing portion 12 of the main member 10. In the present embodiment, the handle portion 30 has a structure in which each of the end portions 30a is connected with a boundary between the conic portion 12A and the flat portion 12B in the closing portion 12. The handle portion 30 is disposed in a projecting bent shape from the closing portion 12 in a direction opposite to the water stop portion 11 in the axis direction. The handle portion 30 is provided with the central axis C of the water stop portion 11 serving as the center. Specifically, as illustrated in FIG. 4, the handle portion 30 has a structure in which a top portion thereof bent to project in the axis direction is disposed on the central axis C. As illustrated in FIG. 3, the handle portion 30 has the structure in which the end portions 30a connected with the closing portion 12 are arranged at a uniform distance d1 from the central axis C, in a direction in which the central axis C is viewed as a point. As illustrated in FIG. 3, the handle portion 30 is disposed at a uniform distance d2 from the outer circumferential edge of the water stop portion 11. The distances d1 and d2 are distances in a diameter direction of the outer circumferential edge of the water stop portion 11 with the central axis C serving as the center. In the present embodiment, the distances d1 and d2 are distances with a width-wise end of each belt-shaped end portion 30a of the handle portion 30 serving as a base point. The handle portion 30 is formed as an elastic member as described above, and capable of being elastically deformed in any direction.

In the grommet 1 configured as described above, inside space portions of the main member 10 (the water stop portion 11 and the closing portion 12) and the tube portion 20 function as an insertion space portion 40, as illustrated in FIG. 5. The insertion space portion 40 is a space portion through which the wire materials W are inserted. The wire materials W are inserted in the axis direction along the central axis C in the main member 10, bent in the main member 10, and inserted along the central axis C' in the tube portion 20. The grommet 1 is attached to the wire materials W such that the wire materials W are inserted through the insertion space portion 40, and thereafter inserted through the through hole 101 together with the end of the wire materials W.

Specifically, as illustrated in FIG. 5, the tube portion 20 of the grommet 1 is inserted through the through hole 101 of the attachment panel 100 together with the end of the wire materials W, and thereafter the handle portion 30 is inserted therethrough. In this state, the handle portion 30 is pulled in the axis direction along the central axis C. In this manner, the water stop portion 11 of the grommet 1 moves toward the through hole 101 while the conic portion 12A of the closing portion 12 moves along the opening edge of the through hole 101. In addition, as illustrated in FIG. 6, the large-diameter portion 11Ac of the recessed portion 11A in the water stop portion 11 of the grommet 1 passes the opening edge of the through hole 101, and the groove bottom 11Ab is fitted with the opening edge. In this manner, the projection 11Aaa of the abutting surface 11Aa of the grommet 1 is elastically deformed and collapsed, and brought into close contact with the panel surface 100a of the attachment panel 100 serving as the circumference of the through hole 101, and the abutting surface 11Aa is pressed against the panel surface 100a. As a result, the grommet 1 can seal the whole circumferential edge of the through hole 101, and securely provide the water stop function. In addition, a winding tape or the like is wound around the inserted wire materials W and the tube portion 20 of the grommet 1, and the opening of the tube portion 20 is subjected to water stopping.

As illustrated in FIG. 7, in a water stop state in which the grommet 1 and the wire harness WH of the present embodiment are inserted through the through hole 101 of the attachment panel 100 and the water stop portion 11 of the main member 10 is fitted, a structure 200 is present on the closing portion 12 side of the main member 10. A narrow region S is formed between the structure 200 and the attachment panel 100. In order to wire the wire materials W in the region S, the grommet 1 and the wire harness WH according to the present embodiment bend, inside the main member 10, the wire materials W inserted from the water stop portion 11 side and pass the wire materials W to the inside of the region S through the tube portion 20. For this reason, the grommet 1 and the wire harness WH according to the present embodiment are provided such that the central axis C' of the tube portion 20 crosses the central axis C of the water stop portion 11.

As described above, in the grommet 1 and the wire harness WH according to the present embodiment, the grommet 1 includes the ring-shaped water stop portion 11 inserted into the through hole 101 formed in the attachment panel 100 and performing water stopping, the closing portion 12 projecting toward the radial inside of the water stop portion 11 and closing the ring shape of the water stop portion 11, the tube portion 20 extending in a direction crossing the axis direction of the water stop portion 11 and provided to penetrate the closing portion 12 and through which the wire materials W are inserted, and the handle portion 30 provided in an arch shape with respect to the closing portion 12 with the central axis C of the water stop portion 11 serving as the center.

In the grommet 1 and the wire harness WH with this structure, the water stop portion 11 of the main member 10 is inserted into the through hole 101 by pulling the handle portion 30. Because the handle portion 30 is provided in an arch shape with respect to the closing portion 12 with the central axis C of the water stop portion 11 serving as the center, the ring-shaped water stop portion 11 can be inserted uniformly with respect to the opening edge of the through hole 101 in the circumferential direction. As a result, the grommet 1 and the wire harness WH can improve workability in attachment to the attachment panel 100.

A conventional grommet and a conventional wire harness have a structure in which the tube portion is provided to extend in the axis direction along the central axis of the water stop portion, and thus pulling the tube portion enables attachment of the grommet and the wire harness to the attachment panel 100. However, as is the case of the grommet 1 and the wire harness WH according to the present embodiment, in the structure in which the tube portion 20 extends in a direction crossing the axis direction of the water stop portion 11, it is impossible to pull the tube portion 20, and insertion is performed by pushing the water stop portion 11 partly in the circumferential direction, which is inferior in workability. In this respect, the grommet 1 and the wire harness WH according to the present embodiment are provided with the handle portion 30 as described above, and workability in attachment to the attachment panel 100 is improved.

In addition, in the grommet 1 and the wire harness WH according to the present embodiment, the handle portion 30 is provided to be elastically deformable at least in the axis direction of the water stop portion 11.

As in the case of the grommet 1 and the wire harness WH according to the present embodiment, when the wire materials W are wired in the narrow region S between the attachment panel 100 and the structure 200, abnormal noise may occur when the handle portion 30 abuts against the structure 200, as illustrated in FIG. 7. Thus, in the grommet 1 and the wire harness WH according to the present embodiment, the handle portion 30 is provided to be elastically deformable at least in the axis direction of the water stop portion 11. Even when the handle portion 30 abuts against the structure 200, elastic deformation of the handle portion 30 eliminates a space that causes oscillation, and prevents occurrence of abnormal noise. When the handle portion 30 is provided to be elastically deformable in any direction, elastic deformation of the handle portion 30 due to abutting against the structure 200 present in any direction eliminates a space that causes oscillation, and prevents occurrence of abnormal noise.

In addition, in the grommet 1 and the wire harness WH according to the present embodiment, the handle portion 30 includes the end portions 30a of the arch shape, the end portions 30a being fixed on the closing portion 12 and arranged at the uniform distance d2 from the outer circumferential edge of the water stop portion 11.

Accordingly, in the grommet 1 and the wire harness WH according to the present embodiment, the end portions 30a of the handle portion 30 are arranged at the uniform distance d2 from the outer circumferential edge of the water stop portion 11. This structure provides pulling force to insert the water stop portion 11 more uniformly with respect to the opening edge of the through hole 101 in the circumferential direction. As a result, the grommet 1 and the wire harness WH can further improve workability in attachment to the attachment panel 100.

The grommet 1 and the wire harness WH according to the present embodiment of the present invention described above are not limited to the embodiment described above, but various changes may be made within the scope described in the claims. In addition, the grommet 1 and the wire harness WH according to the present embodiment may be formed by combining the constituent elements of the embodiment described above and modifications thereof as needed.

The grommet and the wire harness according to the present embodiment have a structure in which the water stop portion is inserted into the through hole by pulling the handle portion. Because the handle portion is provided in an arch shape with respect to the closing portion with the central axis of the water stop portion serving as the center, the ring-shaped water stop portion can be inserted uniformly with respect to the opening edge of the through hole in the circumferential direction. As a result, the grommet 1 and the wire harness WH can improve workability in attachment to the attachment panel.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
    a ring-shaped water stop portion inserted into a through hole formed in an attachment panel and performing water stopping;
    a closing portion projecting toward a radial inside of the water stop portion and closing a ring shape of the water stop portion;
    a tube portion extending in a direction crossing an axis direction of the water stop portion and provided to penetrate the closing portion and through which a wire material is inserted; and
    a handle portion provided in an arch shape with respect to the closing portion with a first central axis of the water stop portion serving as a center, wherein
    the closing portion includes,
        a conic portion extending from and connected to the water-stoop portion, the conic portion tapers away from the water-stop portion, and
        a flat portion that is spaced away from the water stop-portion in the axial direction and intersects the central axis,
    the tube portion is connected to penetrate the conic portion, and
    the tube portion has a second central axis of the tube shape, the second central axis extending to cross the first central axis such that the tube portion extends from the conic portion to cross a direction of the first central axis:
    wherein the handle portion is provided to be elastically deformable at least in the axis direction of the water stop portion;
    wherein the handle portion includes end portions of the arch shape, the end portions being fixed on the closing portion and arranged at a uniform distance from an outer circumferential edge of the water stop portion.

2. The grommet according to claim 1, wherein
    the handle portion includes end portions of the arch shape, the end portions being fixed on the closing portion and arranged at a uniform distance from an outer circumferential edge of the water stop portion.

3. The grommet according to claim 1, wherein
    the handle is connected to a boundary of the conic portion and the flat portion.

4. A wire harness comprising:
    a wire material having conductivity; and
    a grommet provided on the wire material, wherein the grommet includes
- a ring-shaped water stop portion inserted into a through hole formed in an attachment panel and performing water stopping,
- a closing portion projecting toward a radial inside of the water stop portion and closing a ring shape of the water stop portion,
- a tube portion extending in a direction crossing an axis direction of the water stop portion and provided to penetrate the closing portion and through which the wire material is inserted, and
- a handle portion provided in an arch shape with respect to the closing portion with a first central axis of the water stop portion serving as a center, wherein the closing portion includes,
- a conic portion extending from and connected to the water-stoop portion, the conic portion tapers away from the water-stop portion, and
- a flat portion that is spaced away from the water stop-portion in the axial direction and intersects the central axis, the tube portion is connected to penetrate the conic portion, and the tube portion has a second central axis of the tube shape, the second central axis extending to cross the first central axis such that the tube portion extends from the conic portion to cross a direction of the first central axis:

wherein the handle portion is provided to be elastically deformable at least in the axis direction of the water stop portion;

wherein the handle portion includes end portions of the arch shape, the end portions being fixed on the closing portion and arranged at a uniform distance from an outer circumferential edge of the water stop portion.

* * * * *